(12) United States Patent
Pydi

(10) Patent No.: US 8,433,687 B1
(45) Date of Patent: Apr. 30, 2013

(54) OFF-LINE INDEXING FOR CLIENT-BASED SOFTWARE DEVELOPMENT TOOLS

(75) Inventor: Chandra Sekhar Pydi, Hyderabad (IN)

(73) Assignee: Google Inc., Mountain View, CA (US)

( * ) Notice: Subject to any disclaimer, the term of this patent is extended or adjusted under 35 U.S.C. 154(b) by 99 days.

(21) Appl. No.: 13/081,661

(22) Filed: Apr. 7, 2011

(51) Int. Cl.
*G06F 17/30* (2006.01)

(52) U.S. Cl.
USPC ........... 707/673; 707/610; 707/640; 707/661; 707/662; 707/665; 707/667; 707/674; 707/672; 707/736; 707/830; 707/758; 707/781; 707/822; 707/828; 707/829; 707/831; 709/218

(58) Field of Classification Search .................. 707/610, 707/640, 661, 662, 665, 667, 672, 673, 674, 707/736, 758, 781, 822, 828, 829, 830, 831; 709/218

See application file for complete search history.

(56) References Cited

U.S. PATENT DOCUMENTS

| | | | |
|---|---|---|---|
| 6,305,008 B1 | 10/2001 | Vaidyanathan et al. | |
| 6,367,068 B1 | 4/2002 | Vaidyanathan et al. | |
| 6,502,233 B1 | 12/2002 | Vaidyanathan et al. | |
| 7,240,340 B2 | 7/2007 | Vaidyanathan et al. | |
| 2002/0184224 A1 * | 12/2002 | Haff et al. | 707/10 |
| 2005/0097508 A1 | 5/2005 | Jacovi et al. | |
| 2007/0299825 A1 * | 12/2007 | Rush et al. | 707/3 |
| 2010/0030626 A1 * | 2/2010 | Hughes et al. | 705/11 |

* cited by examiner

*Primary Examiner* — Syling Yen
(74) *Attorney, Agent, or Firm* — McDonnell Boehnen Hulbert & Berghoff LLP

(57) ABSTRACT

Disclosed are systems, methods, and devices for providing off-line indexing to client-based software development environments. For example, an integrated development environment (IDE) may be provided, and a request for indexing of source code available to the IDE caused to be transmitted to a remote indexing server. In response, an index of the source code created by the remote indexing server is received and stored at an accessible storage location. In response to detecting at least part of an identifier received by the IDE, the index is accessed and information associated with the identifier retrieved. The associated information can then be displayed via the IDE. Prior to transmitting the indexing request to the remote indexing server, a computing device executing the IDE may first determine whether an index for the source code is already available to the computing device, and only transmit the request if no available index is found.

18 Claims, 8 Drawing Sheets

OFF-LINE INDEXING FOR CLIENT-BASED SOFTWARE DEVELOPMENT TOOLS

BACKGROUND

Unless otherwise indicated herein, the materials described in this section are not prior art to the claims in this application and are not admitted to be prior art by inclusion in this section.

There are many software development tools to help a software programmer produce source code. One standard tool is an integrated development environment (IDE), which provides the programmer with a source code editing environment and additional supporting software development tools. Typically, the IDE includes file management tools for loading and saving source code, an editor for writing new source code and editing existing source code, tools for compiling source code, tools for tracing the operation of the source code, tools for selecting pre-defined and previously defined programming objects used in the source code, etc. An "on-line" help function may also be provided. The on-line help functionality may be invoked upon occurrence of a predetermined event, such as a programmer positioning a cursor over an identifier followed by a clicking of a mouse button, hovering the mouse cursor over an identifier, selecting a menu or icon after highlighting the identifier, or the partial entry of an identifier into the source code via an input device such as a keyboard.

As programs have become more complex, and the size of source code-bases underlying a program have expanded in size, this "on-line" help function has become an important tool for increasing programming productivity and reducing error rates. Modern computer programs typically consist of many different source code files and use one or more programming libraries. These programming libraries may include source and/or object code stored in system libraries, networking libraries, and utility libraries comprising many different classes and functions (e.g., methods in object-oriented programming languages, such as C++).

In addition, modern object oriented languages have implemented a number of concepts, such as function overloading and inheritance, that further complicate matters. Function overloading occurs when multiple functions within a class hierarchy share the same name or identifier, but have differing numbers of parameters or differing parameter types. Inheritance allows a parent class to predefine one or more functions for use, and possible modification, in a child class. Because of the proliferation of libraries and classes, and the introduction of concepts such as function overloading and inheritance, the number of functions available to a software developer has risen quickly. This makes it very difficult if not impossible for a software developer to remember the calling sequence for any one particular function and/or the instantiation requirements for any one particular class, among other problems.

In addition to method and class definitions, software modules will typically define a large number of other identifiers. These additional identifiers may include type definitions (typedefs), variables, macros, parameters, declarators, type qualifiers, keywords, packages, interfaces, expressions, namespaces, templates, objects, labels, operators, file paths, attributes, statements, annotations, literal constants, etc., and each identifier itself may have an associated type, declaration, and/or definition. Particularly in large software projects, it is thus often difficult for a developer to remember the name of the identifier and/or the type, declaration, or definition associated with the identifier. In addition this information may be context dependent, and may vary based on the current scope of the file in the IDE and the scope of the desired identifier.

The on-line help functionality was developed to reduce the burden on the programmer in remembering function names, calling sequences, identifiers, and other programming language lexical elements. For example, when a programmer begins typing a first four letters of a name of a function, the on-line help functionality may access a stored index and determine what function names have a first four letters that match the first four letters that have already been typed by the programmer. The on-line help functionality may then display the matched functions and reference information regarding the matched functions. For example, the reference information may include comments associated with each function explaining its purpose and behavior, or may include a parameter list setting forth parameters required for each function. Once the particular function desired by the programmer has been entered, the on-line help functionality may prompt the programmer to enter a value for each parameter of the selected function and may display associated data types for each parameter, to assist the programmer in completing the function call. In the event that the matched function is overloaded, the on-line help functionality may prune a list of matching overloaded functions as the programmer adds parameters that are incompatible with particular overloaded functions.

SUMMARY

In order to provide such useful on-line help functionality, the IDE must compute one or more indexes of source code files that are part of a project, or referenced by the project, that the programmer is developing. As the size of programming projects has increased, the amount of time necessary to create the one or more indexes has similarly increased. In many cases, the programmer cannot begin or continue programming until the indexing is completed, causing the programmer to lose significant project development time.

One reason that the indexing may take a significant amount of time is that, traditionally, the indexing has been separately completed at each individual IDE running at each programmer's client programming device (e.g., workstation, laptop, desktop, etc.). These general purpose client devices may not have sufficient processing capabilities and/or may not be tuned to process the source files and create indexes in an efficient manner. The delay in indexing could be reduced by offloading the creation of the indexes to one or more dedicated computing clusters tuned to create indexes of source code in a quick and efficient manner.

Additionally, given increases in source file re-use across programmers working on a same project, and programmers using the same source files in different projects, there is a significant opportunity to share created indexes among programmers and among projects, substantially reducing duplicative index creation processes performed at each of a plurality of client programming devices.

Disclosed herein are systems, methods, and devices for decreasing the delay imposed upon programmers in indexing source files, by offloading index creation to dedicated index-creation compute clusters. Additionally, systems, methods, and devices are disclosed for sharing created indexes among client programming devices to reduce the amount of duplicative index creation computation required for providing indexes to a plurality of client programming devices.

In one embodiment, a method includes providing, via a computing device, a software development environment in which a programmer can develop software. Once source code is loaded into the development environment and/or checked out from a code repository, the computing device may determine whether a corresponding index is already locally available by comparing a version identifier stored in the source code with a version identifier associated with a locally-stored index. If a version number match is found, the locally-stored index is used. If a version number match is not found, the source code is queued up for indexing by a remote indexing server. In addition to comparing version identifiers, other methods of determining whether an index is already locally available could be used as well. For example, a last-modified date of the relevant source code file(s) could be used or a calculated hash value (such as a cyclic redundancy check (CRC)) could be used. Other possibilities exist as well.

Source code file(s) queued up for indexing are subsequently removed from the queue, and an indexing request including one of the source code file(s), information sufficient to identify the source code files, or a link to the source code file(s) is transmitted to a remote indexing server for indexing. In response to transmitting the indexing request, one or more indexes related to the source code are transmitted by the remote indexing server and received and stored by the computing device at an accessible storage location. Subsequently, and in response to detecting at least part of an identifier received by the software development environment, the computing device accesses the one or more stored indexes and retrieves information related to the part of the identifier. The computing device then displays at least a portion of the retrieved information in the software development environment.

The at least part of the identifier received by the software development environment could be a programming language-specific identifier or a programming language-agnostic identifier. Examples of programming language-specific identifiers may include, for example, a class name, a function name, a typedef, a variable, a macro, a parameter, a declarator, a type qualifier, a keyword, a package, an interface, an expression, a namespace, a template, an object, a label, an operator, a file path, an attribute, a statement, an annotation, and a literal constant. An example of a programming language-agnostic identifier is a commented identifier preceded by a comment prefix. One example of a commented identifier is a "to do" identifier, which identifiers comments that indicate a future enhancement to be added to the source code. Other examples are also possible.

The one or more indexes received at the computing device from the remote indexing server can be stored within the computing device itself (and thus inherently accessible to the computing device), or at another device locally available to the computing device. For example, a dedicated local indexing server may be used to store created indexes, and may be accessible to the computing device via a wired and/or wireless local-area-network (LAN). In one embodiment, requests for index data at the computing device are then re-directed across the LAN to the local indexing server for fulfillment. Such a centralized local-area cache of indexing information may decrease the amount of delay incurred in transmitting source code to a remote indexing server, and may provide for a first or second location for an IDE on a client programming device to look for indexing information before proceeding to transmit indexing requests and/or source code to the remote indexing server.

In one embodiment, the software development environment may detect local changes made to the source code by a programmer. Instead of off-loading the entire updated source code for re-indexing by the remote indexing server, the software development environment may instead locally index the changes made to the source code, and update the locally-stored index corresponding to the changed source code. Once these changes are saved locally and/or committed back a the source code repository, the software development environment may provide a copy of the locally-stored index corresponding to the changed source code to the remote indexing server for remote storage, and further distribution to future users of the updated source code. In at least one embodiment, an indexing request including information sufficient to identify the source code committed back to the source code repository is transmitted to the remote indexing server, so that the remote indexing server can then retrieve the updated source code and generate corresponding updated index(es). Other possibilities exist as well.

DETAILED DESCRIPTION

Figure 1:
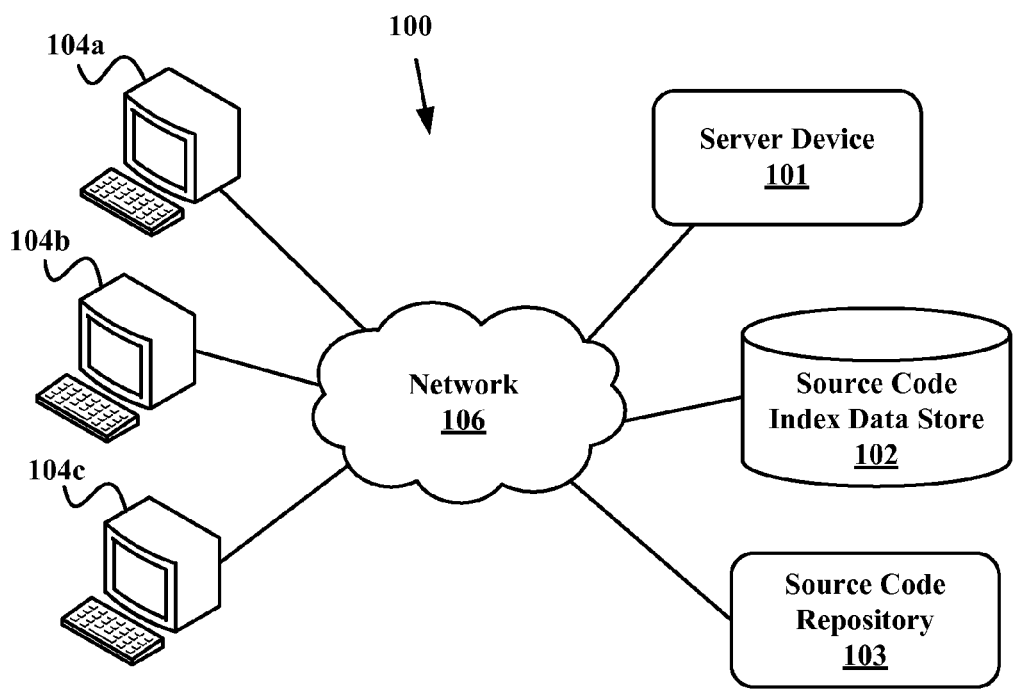
FIG. 1 depicts a distributed computing architecture in accordance with an example embodiment.

The following detailed description describes various features and functions of the disclosed systems, devices, and methods with reference to the accompanying figures. However, the illustrative embodiments described herein are not meant to be limiting. It will be readily understood that certain aspects of the disclosed systems, devices, and methods can be arranged and combined in a wide variety of different configurations, all of which are contemplated herein.

1. Distributed Computing Architecture Overview

Generally speaking, a distributed computing system allows two or more computing devices to coordinate their activities in order to achieve a particular goal or result. This coordination may occur via a network (e.g., a local area network, a wide area network, and/or the Internet) or some other form of communicative coupling. With the rise of cheap computer storage (e.g., random access memory, solid state memory, and hard drives) and always-on, networking computing devices (e.g., personal computers (PCs), laptops, tablet devices, and cell phones), new techniques can be employed to take advantage of distributed computing systems.

In particular, cloud-based computing is a term that can refer to distributed computing architectures in which the data and/or program logic are shared between one or more clients and servers on a substantially real-time basis. Parts of the data and program logic may be pre-stored at the client or may be dynamically delivered, as needed or otherwise, to the client accessing the cloud-based application. Details of the architecture can be transparent to the users of client devices. In one example, cloud-based applications may execute primarily at a local client device, and only access resources at the servers on an as-needed bases (an architecture that may also be referred to as "cloud-aided" or "function-offloading"). In another example, cloud-based application may execute primarily or entirely in a web browser at the local client device so that the user does not need to download, install, and/or manage client software at the client device. Such a web browser may be a standard web browser that is capable of executing program logic consistent with the JavaScript® scripting language, and rendering HyperText Markup Language (HTML) version 3, 4, and/or 5. Alternatively, the web browser could be capable of supporting different scripting languages and markup languages.

Additionally, program logic executing on the client device may enable offline access to primarily cloud-based application. Thus, for example, a user could utilize an email client application, while disconnected from the Internet (or other network), and perform functions such as replying to stored email messages, composing new email messages, and deleting email messages. When the client device is once again able to communicate with the server device, the email client application on the client device may synchronize changes caused by the functions performed by the user in offline mode with the server device. Thus, the client device may inform the server device of the replied to, composed, and/or deleted email messages. Then, the server device may update its copy of this data accordingly.

An email application described above is just one example of a cloud-based application. Other types of cloud-based applications may include office productivity suites, blogs, online stores, multimedia applications, and software development environments. Given the distributed nature of cloud-based applications, various types of functionality included in these applications, or used to facilitate the design and execution of these applications, may also be distributed across multiple software modules and/or hardware platforms. To illustrate such a possible arrangement, FIG. 1 depicts a distributed computing architecture in accordance with an example embodiment.

In FIG. 1, a server device 101 is configured to communicate, via a network 106, with client devices 104a, 104b, and 104c. The server device 101 also has access to a source code index data store 102 and a source code repository 103. Server device 101 may communicate with source code index data store 102 and/or source code repository 103 via network 106 (or some other network separate from network 106). In another example, source code index data store 102 and/or source code repository 103 may be co-located with server device 101.

Network 106 may correspond to a LAN, a wide area network (WAN), a corporate intranet, the public Internet, or any other type of network configured to provide a communications path between networked computing devices. The network 106 may also correspond to a combination of one or more LANs, WANs, corporate intranets, and/or the public Internet.

Although FIG. 1 only shows three client devices, distributed application architectures may serve tens, hundreds, or thousands of client devices. Moreover, client devices 104a, 104b, and 104c (or any additional client devices) may be any sort of computing device, such as an ordinary laptop computer, desktop computer, network terminal, wireless communication device (e.g., a cell phone or smart phone), and so on. In some embodiments, client devices 104a, 104b, and 104c may be dedicated to the design and use of cloud-based applications, such as software development tools. In other embodiments, client devices 104a, 104b, and 104c may be general purpose computers that are configured to perform a number of tasks and need not be dedicated to cloud-based applications.

2. Computing Device Architecture

Figure 2A:
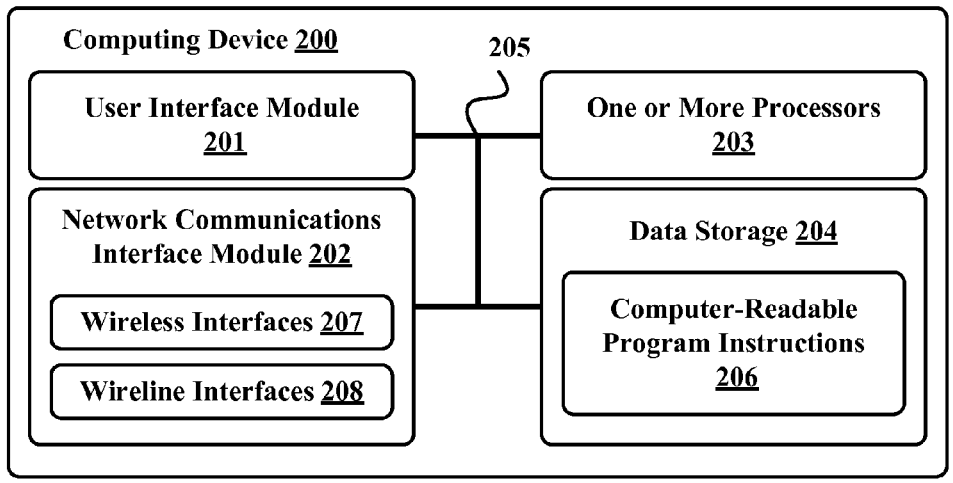
FIG. 2A is a block diagram of a computing device in accordance with an example embodiment.

FIG. 2A is a block diagram of a computing device in accordance with an example embodiment. In particular, computing device 200 shown in FIG. 2A can be configured to perform one or more functions of server device 101, source code index data store 102, source code repository 103, and/or one or more of client devices 104a, 104b, and 104c. Computing device 200 may include a user interface module 201, a network-communication interface module 202, one or more processors 203, and data storage 204, all of which may be linked together via a system bus, network, or other connection mechanism 205.

The user interface module 201 may be operable to send data to and/or receive data from external user input/output devices. For example, the user interface module 201 may be configured to send and/or receive data to and/or from user input devices such as a keyboard, a keypad, a touch screen, a computer mouse, a track ball, a joystick, a voice recognition module, and/or other similar devices, either now known or later developed. The user interface module 201 may also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. The user interface module 201 may also be configured to generate audible output(s), such as a speaker, speaker jack, audio output port, audio output device, earphones, and/or other similar devices, either now known or later developed.

The network-communications interface module 202 may include one or more wireless interfaces 207 and/or one or more wireline interfaces 208 that are configurable to communicate via a network, such as the network 106 shown in FIG. 1. The wireless interfaces 207 may include one or more wireless transmitters, receivers, and/or transceivers, such as a Bluetooth transceiver, a Wi-Fi transceiver, a WiMAX transceiver, and/or other similar type of wireless transceiver configurable to communicate via a wireless network. The wireline interfaces 208 may include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, the network communications interface module 202 may be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms may be used as well or in addition to those listed herein to secure (and then decrypt/decode) communications.

The one or more processors 203 may include one or more general purpose processors and/or one or more special purpose processors (e.g., digital signal processors, application specific integrated circuits, etc.). The one or more processors 203 may be configured to execute computer-readable program instructions 206 that are contained in the data storage 204 and/or other instructions as described herein.

The data storage 204 may include one or more computer-readable storage media that can be read or accessed by at least one of the processors 203. The one or more computer-readable storage media may include volatile and/or non-volatile storage components, such as optical, magnetic, organic or other memory or disc storage, which can be integrated in whole or in part with at least one of the processors 203. In some embodiments, the data storage 204 may be implemented using a single physical device (e.g., one optical, magnetic, organic or other memory or disc storage unit), while in other embodiments, the data storage 204 may be implemented using two or more physical devices.

The data storage 204 may include computer-readable program instructions 206 and perhaps additional data. In some embodiments, the data storage 204 may additionally include storage required to perform at least part of the herein-described methods and techniques and/or at least part of the functionality of the herein-described devices and networks.

3. Cloud-Based Servers

Server device 101, source code index data store 102, and source code repository 103 may be cloud-based devices that store program logic and/or data of cloud-based applications and/or services. In some embodiments, server device 101, source code index data store 102, and source code repository 103 may be a single computing device residing in a single computing center. In other embodiments, server device 101, source code index data store 102, and source code repository 103 may include multiple computing devices in a single computing center, or even multiple computing devices located in multiple computing centers located in diverse geographic locations. For example, FIG. 1 depicts each of server device 101, source code index data store 102, and source code repository 103 residing in different physical locations.

In some embodiments, data and services at server device 101, source code index data store 102, and source code repository 103 may be encoded as computer readable information stored in tangible computer readable media (or computer readable storage media) and accessible by client devices 104a, 104b, and 104c, and/or other computing devices. In some embodiments, source code index data store 102 and/or source code repository 103 may be a single disk drive or other tangible storage media, or may be implemented on multiple disk drives or other tangible storage media located at one or more diverse geographic locations.

Figure 2B:
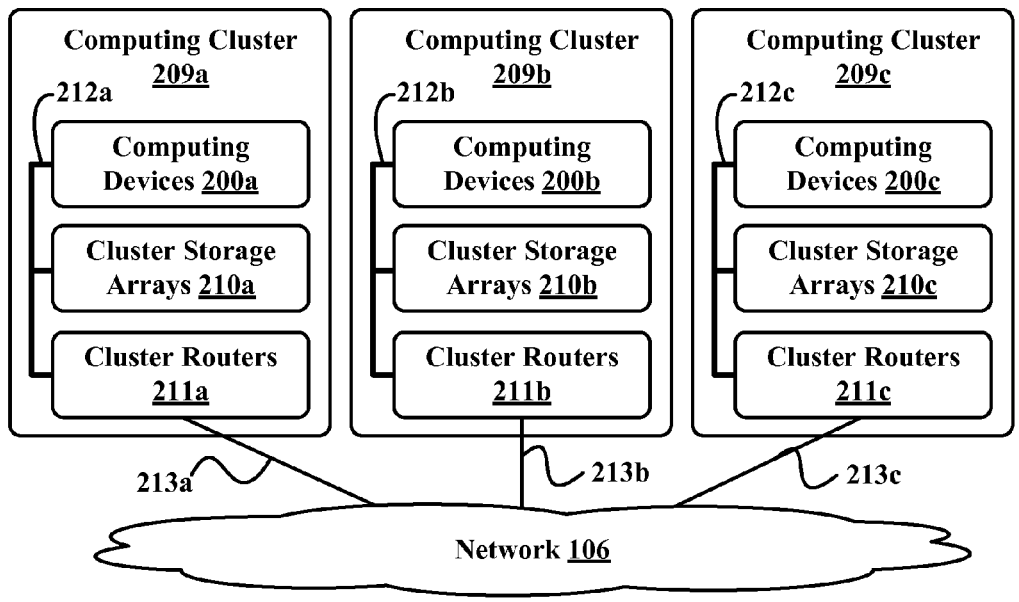
FIG. 2B depicts a cloud-based remote indexing server system in accordance with an example embodiment.

FIG. 2B depicts a cloud-based server system in accordance with an example embodiment. In FIG. 2B, the functions of server device 101, source code index data store 102, and source code repository 103 may be distributed among three computing clusters 209a, 209b, and 208c. Computing cluster 209a may include one or more computing devices 200a, cluster storage arrays 210a, and cluster routers 211a connected by a local cluster network 212a. Similarly, computing cluster 209b may include one or more computing devices 200b, cluster storage arrays 210b, and cluster routers 211b connected by a local cluster network 212b. Likewise, computing cluster 209c may include one or more computing devices 200c, cluster storage arrays 210c, and cluster routers 211c connected by a local cluster network 212c.

In some embodiments, each of the computing clusters 209a, 209b, and 209c may have an equal number of computing devices, an equal number of cluster storage arrays, and an equal number of cluster routers. In other embodiments, however, each computing cluster may have different numbers of computing devices, different numbers of cluster storage arrays, and different numbers of cluster routers. The number of computing devices, cluster storage arrays, and cluster routers in each computing cluster may depend on the computing task or tasks assigned to each computing cluster.

In computing cluster 209a, for example, computing devices 200a can be configured to perform various computing tasks of server device 101. In one embodiment, the various functionalities of server device 101 can be distributed among one or more of computing devices 200a, 200b, and 200c. Computing devices 200b and 200c in computing clusters 209b and 209c may be configured similarly to computing devices 200a in computing cluster 209a. On the other hand, in some embodiments, computing devices 200a, 200b, and 200c may be configured to perform different functions.

In some embodiments, computing tasks and stored data associated with server device 101, source code index data store 102, and source code repository 103 can be distributed across computing devices 200a, 200b, and 200c based at least in part on the processing requirements of the server device 101, source code index data store 102, and source code repository 103, the processing capabilities of computing devices 200a, 200b, and 200c, the latency of the network links between the computing devices in each computing cluster and between the computing clusters themselves, and/or other factors that may contribute to the cost, speed, fault-tolerance, resiliency, efficiency, and/or other design goals of the overall system architecture.

The cluster storage arrays 210a, 210b, and 210c of the computing clusters 209a, 209b, and 209c may be data storage arrays that include disk array controllers configured to manage read and write access to groups of hard disk drives. The disk array controllers, alone or in conjunction with their respective computing devices, may also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server device 101, source code index data store 102, and source code repository 103 can be distributed across computing devices 200a, 200b, and 200c of computing clusters 209a, 209b, and 209c, various active portions and/or backup portions of these components can be distributed across cluster storage arrays 210a, 210b, and 210c. For example, some cluster storage arrays may be configured to store the data of server device 101, while other cluster storage arrays may store source code index data store 102 and/or source code repository 103. Additionally, some cluster storage arrays may be configured to store backup versions of data stored in other cluster storage arrays.

The cluster routers 211a, 211b, and 211c in computing clusters 209a, 209b, and 209c may include networking equipment configured to provide internal and external communications for the computing clusters. For example, the cluster routers 211a in computing cluster 209a may include one or more internet switching and routing devices configured to provide (i) local area network communications between the computing devices 200a and the cluster storage arrays 201a via the local cluster network 212a, and (ii) wide area network communications between the computing cluster 209a and the computing clusters 209b and 209c via the wide area network connection 213a to network 106. Cluster routers 211b and 211c can include network equipment similar to the cluster routers 211a, and cluster routers 211b and 211c can perform similar networking functions for computing clusters 209b and 209b that cluster routers 211a perform for computing cluster 209a.

In some embodiments, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of local networks 212a, 212b, 212c, the latency, throughput, and cost of wide area network links 213a, 213b, and 213c, and/or other factors that may contribute to the cost, speed, fault-tolerance, resiliency, efficiency and/or other design goals of the moderation system architecture.

4. Distributed Software Development Architecture

Figure 3:
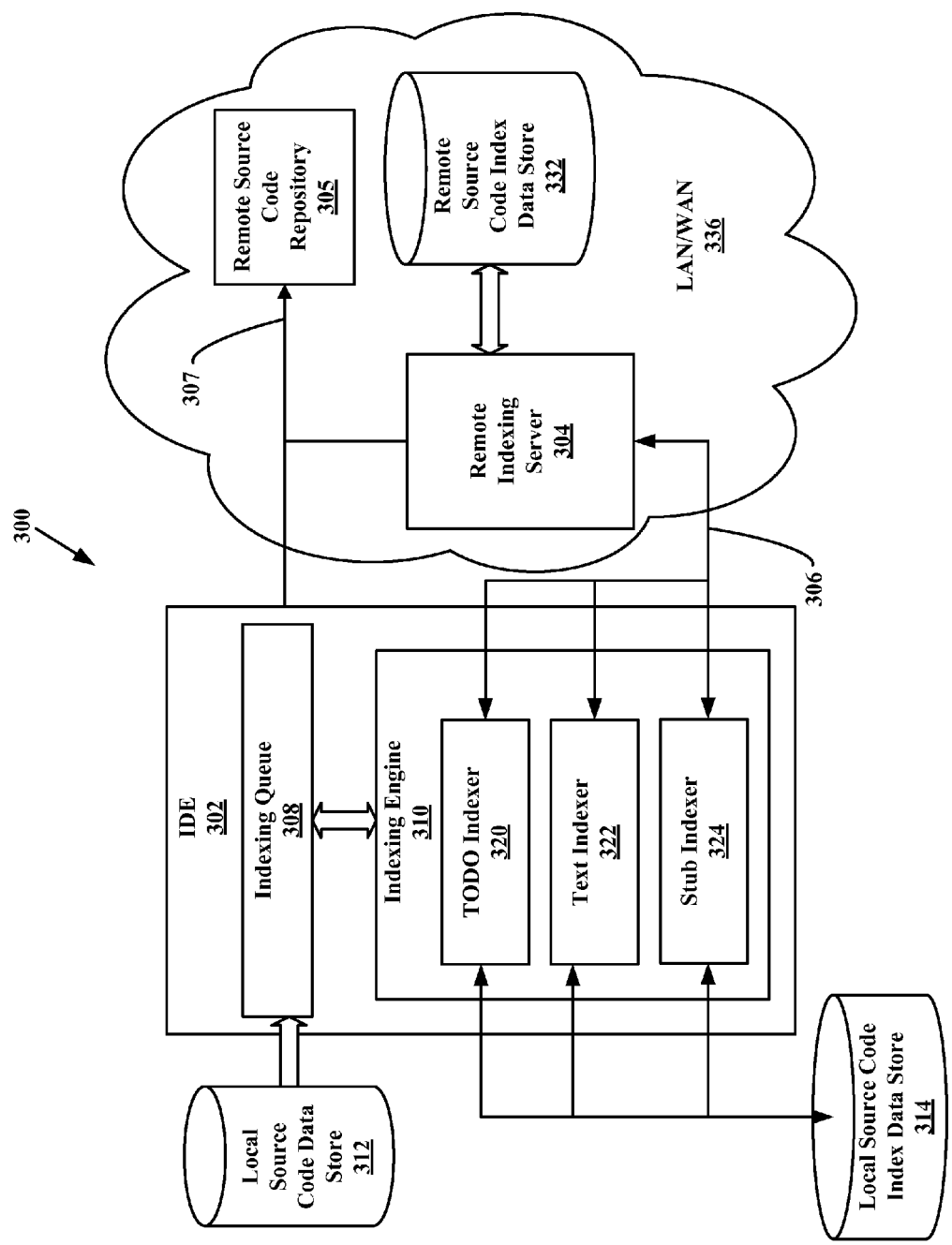
FIG. 3 is a block diagram of a distributed source code indexing architecture, in accordance with an example embodiment.

FIG. 3 is a block diagram of a distributed software development architecture, in accordance with an example embodiment. In particular, FIG. 3 shows a distributed software architecture 300 that includes an integrated development environment (IDE) 302 coupled to a remote indexing server 304 via a connection 306 and to a remote source code repository 305 via a connection 307. In one example, the IDE 302 may be comprised of a number of software modules stored in data storage 204 and being executed by one or more processors 203 of a computing device 200, as illustrated in FIG. 2A. Similarly, the remote indexing server 304 may be comprised of a number of software modules stored in cluster data storage 210a of a computing cluster 209a and being executed by one or more computing devices 200a. Of course, other possibilities exist as well.

The software modules comprising IDE 302 may be configured to provide a number of tools for use by a programmer in developing source code. As discussed earlier, such tools may include file management functions (loading and saving source code), editing functions (for writing new source code and editing existing source code), compilation functions, linking functions, source code repository functions, and debugging and/or tracing functions, among others. The editing functions provided by IDE 302 may include an on-line help functionality invoked upon occurrence of a predetermined event, and which may provide functions such as source code-completion to aid programmers in developing new source code and editing existing source code.

As set forth in FIG. 3, IDE 302 may include an indexing queue 308 and an indexing engine 310, and may interface with a local source code data store 312 and a local source code index data store 314. While the data stores 312 and 314 are illustrated as separate stores in FIG. 3 for ease of illustration, in some embodiments, the local source code data store 312 and the local source code index data store 314 may instead be formed as separate or interleaved data store areas on a same data storage device. Source code files loaded from local source code data store 312 and/or checked-out from remote source code repository 305 are checked to determine whether a locally-available index is already available at local source code index data store 314. Source code files that need to be indexed, either because the source code file has never been indexed, or because the source code file has been modified since a last-available index, are added to the queue 308. Source code files loaded or checked-out by IDE 302 may be added to the indexing queue 308 while files are being removed from the queue for indexing by indexing engine 310. For example, indexing queue 308 may act as a first in first out (FIFO) buffer. Other configurations are possible as well, such as use of other data structures than a queue for the functionality of indexing queue 308; e.g., replacing indexing queue 308 with a last in first out (LIFO) buffer or a stack.

Local source code data store 312 stores source code associated with one or more projects on which a programmer has either worked with in the past, is currently working with, or intends to work with in the future. Source code files may include, for example, .h header files and .c source code files with respect to source code based on the C programming language, .hh header files and .cc source code files with respect to source code based on the C++ programming language, .java source code files with respect to source code based on the JAVA programming language, .js source code files with respect to source code based on the JavaScript programming language, .html source code files with respect to markup code based on the HyperText Markup Language (HTML). Many other possibilities exist as well.

Similar to local source code data store 312, remote source code repository 305 may store one or more projects on which a programmer or group of programmers have either worked with in the past, are currently working with, or intend to work with in the future. Source code repository may act as a clearinghouse of source code files for a particular project, and may provide functions such as version control, checkout and commit processes, merge processes, branching and forking processes, and many other functions traditionally provided by such software control management systems. Similar to local source code data store 312, the source code files managed by the remote source code repository 305 may include, for example, .h header files and .c source code files with respect to source code based on the C programming language, .hh header files and .cc source code files with respect to source code based on the C++ programming language, .java source code files with respect to source code based on the JAVA programming language, .js source code files with respect to source code based on the JavaScript programming language, .html source code files with respect to markup code based on the HyperText Markup Language (HTML). Many other possibilities exist as well.

IDE 302 may have access to remote source code repository 305 via connection 307. Connection 307 may be a wired or wireless connection. An example wireless connection may include one or more of a Bluetooth connection, a Wi-Fi connection, a WiMAX connection, and/or other similar type of wireless connections over an open air medium. An example wireline connection may include one or more of an Ethernet connection, a Universal Serial Bus (USB) connection, or similar connection over one or more mediums such as a twisted pair wire, a coaxial cable, a fiber-optic link, or a similar physical medium. Connection 306 may further contain one or more base stations, routers, switches, LANs, WLANs, WANs, access points, or other network infrastructure. Other variations are also possible.

Local source code index data store 314 stores indexes created by one or more of the respective indexers of indexing engine 310 or received from remote indexing server 304. These indexes may include, for example, a TODO index created by TODO indexer 320, a text index created by text indexer 322, and a stub index created by stub indexer 324. Each of these indexes may provide different information (or the same information in a different way) to IDE 302, and may be used in various ways by IDE 302 in providing on-line help functionality to aid programmers in developing new source code and editing existing source code.

For example, the TODO indexer 320 parses source code files that it receives for comment prefixes and a predetermined identifier in order to locate and index "to do" statements, and generate a TODO index. To do statements are tags that are placed in the source code by a programmer to indicate a planned future enhancement to the source code. The to do statement is generally placed in a position in the source code near where the planned enhancement is intended to be added. Comment delimiters that may precede a to do statement include, as examples, a double slash "//" and a slash star "/*". In some embodiments, a to do statement can be followed by a comment delimiter as well, such as a star slash "*/". Once a comment is located by a parser in the TODO indexer 320, the parser looks for a predetermined identifier indicating a "to do" statement, such as the capitalized conjoined words "TODO." Once a to do statement is found within a comment, the TODO indexer 320 records the location of the to do statement (e.g., file name and line number), and the contents of the to do statement, in a TODO index in local source code index data store 314. The TODO index may be stored in any one of a number of varying formats, including, for example, plain text, comma separated value (CSV), data interchange format (DIF), extensible markup language (XML), or other file formats. The TODO index may be stored in a separate file for each respective source code file indexed, may be stored in an aggregate index (e.g., aggregate of all to do index information or aggregate of all to do, stub, and text index information, among other possibilities), or may be stored in some other fashion. Additionally or alternatively, the TODO index may be stored in a database management system (DBMS) such as MySQL.

The TODO indexer 320 is an example of a programming language-agnostic indexer in that the index it creates is agnostic of the underlying programming language in the source code. Rather, it merely searches for commented identifiers indicating future work to be executed in whatever the underlying programming language of the source code file is.

In addition to the TODO indexer 320, text indexer 322 may be implemented by indexing engine 310 to parse source code files that it receives for word occurrences and to generate a text index. For example, for a particular source code file, the text indexer 322 may record the words that appear in the source code file, the number of times each appear, and the context in which they appear (e.g., inside a source code statement, inside a comment, inside a source code string, etc.). The text indexer 322 may also maintain a mapping between these word occurrences and the filename (perhaps including the file path) of the source code file in which they appear. The created text index may be stored in any one of a number of varying files, formats, and/or databases as set forth above with respect to the TODO indexer 320.

The text indexer 322 is another example of a programming language-agnostic indexer in that the index it creates is agnostic of the underlying programming language in the source code. Rather, the text indexer 322 searches for word occurrences, records their location and context, and stores the mappings for future use by the IDE 302.

In addition to the TODO indexer 320 and the text indexer 322, stub indexer 324 may be implemented by indexing engine 310 to parse source code files that it receives for programming-language specific source code structure and to create a stub index. A stub index is essentially a skeleton of a source code file, and reflects programming-language specific structures and their inter-relationships. For example, in the case of a .java source code file including JAVA language programming instructions, a generated stub file may contain information about import statements, class definitions and their member elements, function names, annotations, interfaces, classes being extended, variables (public and/or private), and other programming language-specific instructions. The created stub index may be stored in any one of a number of varying files, formats, and/or databases as set forth above with respect to the TODO indexer 320.

The stub indexer 324 is an example of a programming language-specific indexer in that the indexer must have some knowledge of the underlying programming language and its constructs to properly create a stub index reflecting the underlying structure and inter-relationships between programming instructions in the source code file. Examples of the TODO index, text index, and stub index will be provided with respect to FIGS. 4 and 5.

Once the respective indexes are created, they may be stored in the local source code index data store 314 of FIG. 3. While FIG. 3 illustrates indexing engine 310 as including a TODO indexer 320, a text indexer 322, and a stub indexer 324, in some embodiments, indexing engine 310 may include a subset of these indexers, and in some embodiments, may include other indexers in addition to these indexers.

In addition to having access to indexes locally available via local source code index data store 314, indexing engine 310 also has access (perhaps directly or via IDE 302) to remote indexing server 304 via connection 306. Connection 306 may be a wired or wireless connection. An example wireless connection may include one or more of a Bluetooth connection, a Wi-Fi connection, a WiMAX connection, and/or other similar type of wireless connections over an open air medium. An example wireline connection may include one or more of an Ethernet connection, a Universal Serial Bus (USB) connection, or similar connection over one or more mediums such as a twisted pair wire, a coaxial cable, a fiber-optic link, or a similar physical medium. Connection 306 may further contain one or more base stations, routers, switches, LANs, WLANs, WANs, access points, or other network infrastructure. Other possibilities exist as well.

As set forth in FIG. 3, IDE 302 may include an indexing queue 308 and an indexing engine 310, and may interface with a local source code data store 312 and a local source code index data store 314. While the data stores 312 and 314 are illustrated as separate stores in FIG. 3 for ease of illustration, in some embodiments, the local source code data store 312 and the local source code index data store 314 may instead be formed as separate or interleaved data store areas on a same data storage device. Source code files loaded from local source code data store 312 and/or checked-out from remote source code repository 305 are checked to determine whether a locally-available index is already available at local source code index data store 314. Source code files that need to be indexed, either because the source code file has never been indexed, or because the source code file has been modified since a last-available index, are added to the queue 308. Source code files loaded or checked-out by IDE 302 may be added to the indexing queue 308 while files are being removed from the queue for indexing by indexing engine 310. For example, indexing queue 308 may act as a first in first out (FIFO) buffer. Other configurations are possible as well, such as use of other data structures than a queue for the functionality of indexing queue 308; e.g., replacing indexing queue 308 with a last in first out (LIFO) buffer or a stack.

IDE 302 may be configured to, upon loading a source code file from local source code data store 312 or checking out a source code file from remote source code repository 305, determine whether an index is already locally available for the received source code file. For example, by caching a local copy of the source code file (and/or information regarding the source code file) and respective created indexes in local source code index data store 314 for any files indexed by indexing engine 310 or remote indexing server 304, future requests for indexing of a source code file can potentially be filled more quickly by confirming the equivalence of the source code files and then simply loading the corresponding source code index from local source code index data store 314. Confirming equivalence of the source code files could be accomplished in a number of different ways. For example, IDE 302 may determine that a source code loaded from local source code data store 312 or checked out from remote source code repository 305 is equivalent to a source code file on which an index has already been created and stored in local source code index data store 314 (by, for example, comparing a filename and version identifier of the source code file with which the index is associated and a filename and version identifier of the loaded source code file) If the file names and version identifiers match, IDE 302 may bypass adding the loaded and/or retrieved source code file to the indexing queue 308. In at least one embodiment, IDE 302 may compare associated source code file names and last-modified dates. Instead or in addition, IDE 302 may compare calculated hash values (such as a CRC) associated with each source code file. Other possibilities exist as well. If a locally available index is not available in local source code index data store 314, IDE 302 may then add the source code file to the indexing queue 308, and subsequently contact, via indexing engine 310, the remote indexing server 304 to obtain respective indexes.

Remote indexing server 304 may contain an indexing engine (not shown) substantially similar to indexing engine 310, and may include, for example, a TODO indexer, a text indexer, and a stub indexer, among other possibilities. For example, upon initial start-up of IDE 302 or initial loading of a new project or software development kit (SDK) into an existing instance of IDE 302, source code files associated with the loaded project or SDK may be enqueued in indexing queue 308, the source code files themselves or links thereto provided to indexing engine 310, and then the source code files themselves or links thereto transmitted via connection 306 to remote indexing server 304 (e.g., the actual source code files or a link identifying a location at which remote indexing server 304 may retrieve the source code files). An instruction accompanying the source code files or links may provide remote indexing server 304 with a list of indexes to be generated (e.g., one or more of TODO, text, stub, etc.). The instruction may also provide an indication of what further action to take if a corresponding index is not immediately available at remote indexing server 304. For example, in one embodiment, the instruction may request a message in return indicating that the requested corresponding index is not available. In response to such a return message, the IDE 302 may then compute the corresponding index on its own via indexing engine 310. In another embodiment, the instruction may request that the remote indexing server 304 obtain the source code file (e.g., from the transmission itself, or via remote source code repository 305 via link 307, for example), index the source file, and provide an index in return. Other possibilities exist as well.

In the event that a corresponding index is not already available, and remote indexing server 304 must index the corresponding source code files, remote indexing server 304 may store a copy of (or information regarding) the corresponding source code files and respective created indexes in remote source code index data store 332, in addition to providing the respective created indexes back to indexing engine 310 (e.g., the actual indexes or a link identifying a location at which indexing engine 310 may retrieve the indexes). By storing a local copy of the source code files (or information regarding them) and respective created indexes at remote source code index data store 332, future requests by the same or different IDE for an index of a source code file that has already been indexed by remote indexing server 304 can be filled more quickly by confirming the equivalence of the source code files, loading the corresponding source code index from remote source code index data store 332, and then transmitting the loaded source code index to the requesting IDE. Confirming equivalence of source code files could be accomplished in much a same manner as that set forth above with respect to indexing engine 310 and local source code index data store 314. In at least one embodiment, communications between indexing engine 310 and remote indexing server 304 may occur in a step-wise manner. For example, indexing engine 310 may first transmit sufficient information to identify a source code file without actually sending the source code file (e.g., one or more of a file name, file path, last-modified date, hash value, etc.), and request remote indexing server 304 check its remote source code index data store 332 for already-created corresponding indexes. In the event such a corresponding index exists, remote indexing server 304 may then transmit the corresponding index back to indexing engine 310. In the event such a corresponding index does not yet exist, remote indexing server 304 may transmit an error message back to indexing engine 310, and request that the corresponding source code file (or a link thereto) be transmitted by indexing engine 310 in response, for full indexing by remote indexing server 304. Other possibilities exist as well.

In at least one embodiment, remote indexing server 304 may maintain an ongoing or intermittent connection with remote source code repository 305 via connection 307, for the purposes of creating indexes for one or more versions of source code files stored at remote source code repository 305. By maintaining up-to-date indexes (e.g., in remote source code index data store 332) of source code files stored at remote source code repository 305, remote indexing server 304 can more quickly and efficiently fulfill indexing requests by client IDE's. In order to avoid a build-up of stale indexes, remote indexing server 304 may maintain a moving-window of indexes for a plurality of versions of each source code file at remote source code repository that it tracks. For example, the size of the moving window may be five, such that as a new revision of a source code file is detected by remote indexing server 304 at remote source code repository 305, the fifth-oldest index (perhaps based on date or version number, among other possibilities) is removed from the remote source code index data store 332. Of course, the moving number could be any number, for example, including a number in the range of 1-20. In at least one embodiment, instead of polling remote source code repository for new source code files and/or revisions for indexing, remote source code repository 305 may be configured to notify the remote indexing server upon creation of a new source code file or the commitment of changes to an existing source code file. The notification could include a copy of the source code file itself, or a link to the source code file for further retrieval by remote indexing server 304. Other possibilities exist as well.

Although FIG. 3 shows a separate remote indexing server 304 and remote source code index data store 332, in one embodiment, the data store 332 may be integrated with the remote indexing server 304. Alternatively, data store 332 may be disposed at a different location and accessible to remote indexing server 304 via LAN/WAN 334. Furthermore, although FIG. 3 shows a separate remote indexing server 304 and remote source code repository 305, in one embodiment, the repository 305 may be integrated with the remote indexing server 304. Alternatively, the repository 305 may be disposed at a different location and accessible to remote indexing server 304 via LAN/WAN 334.

Furthermore, although only one remote indexing server 304, one remote source code repository 305, and one remote source code index data store 332 are illustrated in FIG. 3, in at least one embodiment, more than one remote indexing server 304, remote source code repository 305, and remote source code index data store 332 may be provided.

In at least one embodiment, IDE 302 may be configured to immediately transmit source code files loaded from local source code data store 312 or retrieved from indexing queue 308 directly to remote indexing server 304 via connection 306, eliminating any need for indexing engine 310. However, without a local indexing engine at IDE 302, incremental changes to source code files made via IDE 302 may not be reflected in source code indexes stored at local source code index data store 314 until the source code files (including the changes) are transmitted for re-indexing to remote indexing server 304. Thus, one advantage of maintaining a local indexing engine 310 at IDE 302 is that incremental changes to source code files made at IDE 302 can be detected by indexing engine 310, and may cause one or more of the indexers 320, 322, and 324 to update respective source code indexes stored at local source code index data store 314. Because the processing power required to update already existing indexes is relatively small compared to an initial indexing operation, IDE 302 should not experience the same delays and downtime associated with waiting for a complete initial indexing of source code files mentioned above.

5. IDE On-Line Help User Interface

Figure 4:
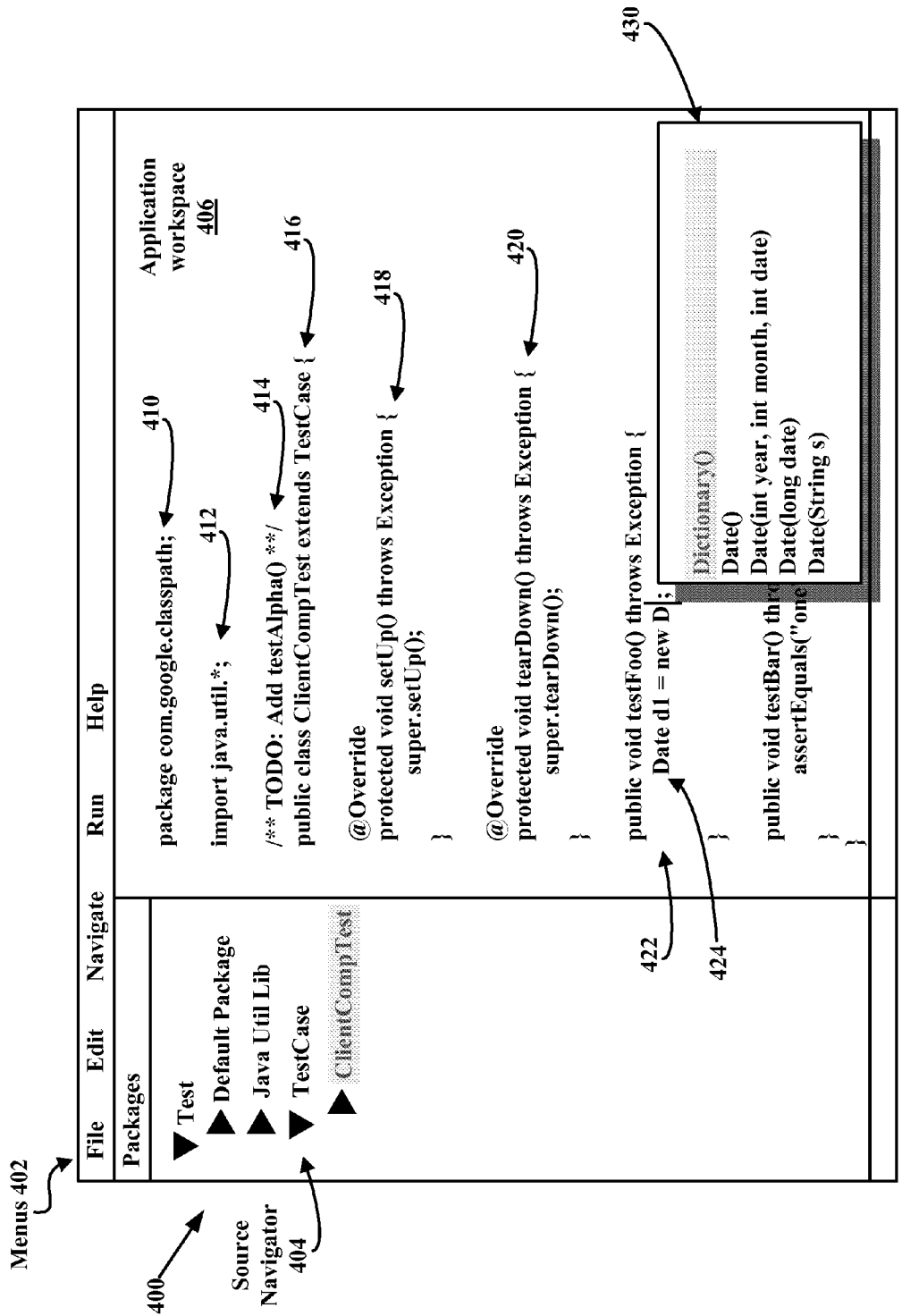
FIG. 4 depicts an integrated development environment (IDE) in accordance with an example embodiment.
Figure 5:
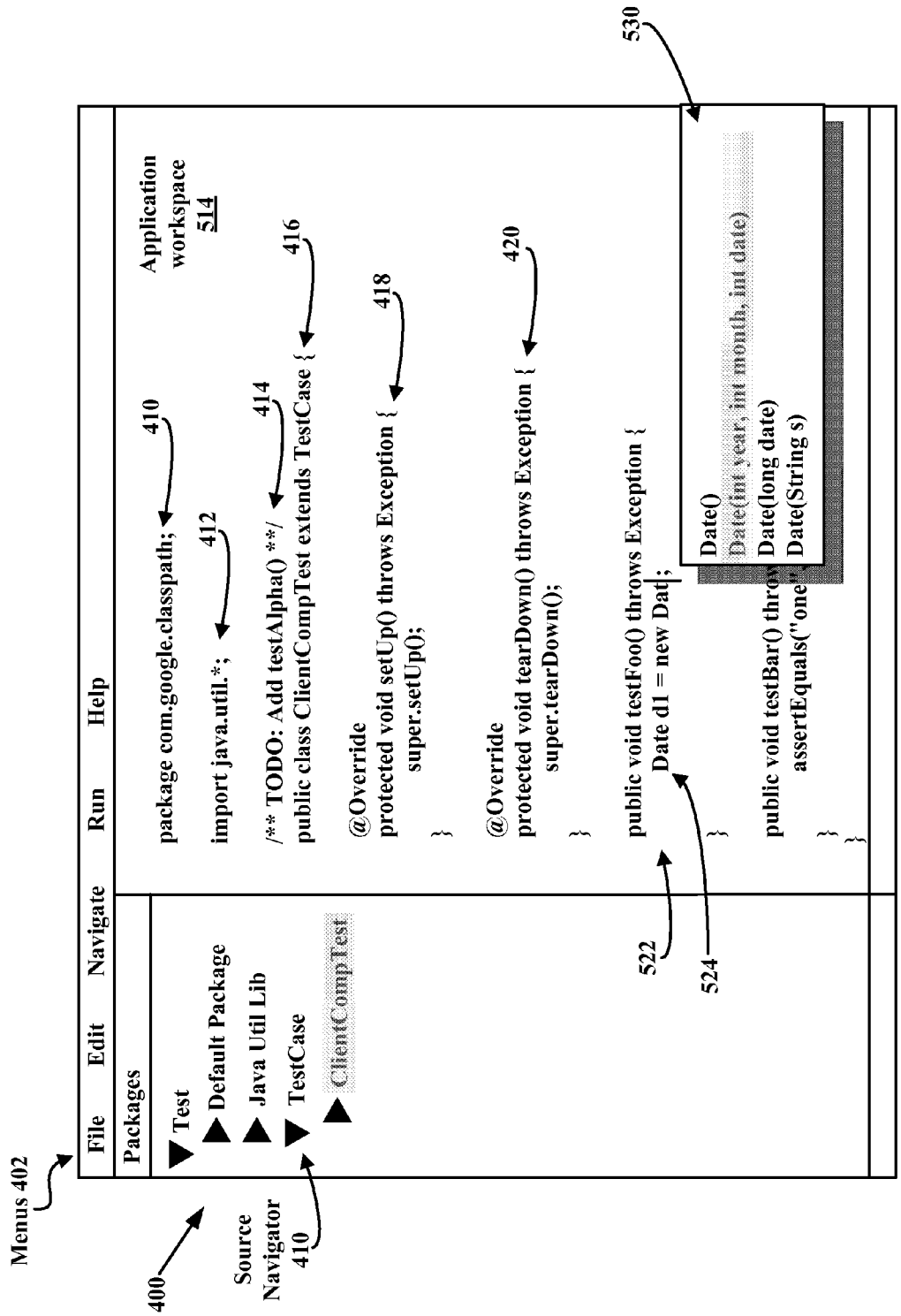
FIG. 5 depicts a further example of the IDE of FIG. 4.

FIGS. 4 and 5 illustrate examples of a user interface to IDE 302, including an on-line help functionality that could benefit from the indexing operations of indexing engine 310 and/or remote indexing server 304. User interface 400 includes menus 402, source navigator 404, application workspace 406, programming instructions 410-422, and on-line help source code completion pop-up box 430.

Menus 402 include a set of drop-down menus, including a "File" drop-down menu, an "Edit" drop-down menu, a "Source" drop-down menu, a "Navigate" drop-down menu, a "Run" drop-down menu, and a "Help" drop-down menu. More or fewer drop-down menus may be included in IDE user interface 400. Also, it should be understood that each of the drop-down menus in menus 402 are shown in their non-dropped-down state. Thus, by hovering a cursor or pointer over a particular drop-down menu, or by selecting a drop-down menu, the respective drop-down menu's items may be displayed.

For example, selecting the "File" drop-down menu may result in options being displayed for creating a new source code file or project, loading an existing source code file or project, saving a currently-loaded source code file or project, committing changes to a currently-loaded source code file or project (e.g., to remote source code repository 305), and/or printing a copy of a currently-loaded source code file or project. In another example, selecting the "Edit" drop-down menu may result in options being displayed for copying, cutting, pasting, or searching programming instructions displayed in the application workspace 406. In another example, selecting the "Navigate" drop-down menu may result in options being displayed for navigating within a source code file displayed in application workspace 406 and/or between source code files in a currently-loaded project. In a still further example, selecting the "Run" drop-down menu may provide options for compiling and/or debugging the currently-loaded source code file or project. In yet another example, selecting the "Help" drop-down menu may result in options being displayed for assisting the programmer in interfacing with the IDE via user interface 400.

The source navigator 404 may provide a visual means in which a programmer can navigate through source code files in a currently loaded project (e.g., in addition or as an alternative to using the "Navigate" drop-down menu). As illustrated in FIG. 4, the source navigator 404 allows the programmer to move between a current class ("ClientCompTest"), a parent class ("TestCase"), and one or more default imported packages ("Default" and "Java Util Lib"). A highlight or other visual augmentation may illustrate the programming element currently being displayed in application workspace 406 (here, for example, the ClientCompTest class).

The application workspace 406 displays all or a portion of the contents of a currently-loaded source code file, which in this case, includes programming instructions 410-422. The "package com.google.classpath;" programming instruction 410 identifies the package that the displayed file's class or classes belong to. The "import java.util.*;" programming instruction 412 imports all classes from the standard java.util package. The programming instruction 414 is a comment including a TODO identifier indicating an intention to add future enhancements (e.g., a "testAlpha( )" function) to the current class. The programming instruction 416 begins the declaration of a public class ClientCompTest that extends a parent class TestCase. The programming instruction 418 defines a member function setUp( ) of the ClientCompTest class that overrides another setUp( ) function (perhaps defined in the parent TestCase class). The programming instruction 420 defines a member function tearDown( ) of the ClientCompTest class that overrides another tearDown( ) function (perhaps defined in the parent TestCase class). The programming instruction 422 defines a member function test-Foo( ) that includes a partial statement 424 defining a new variable d1 of type Date and assigning a value to the variable d1.

The on-line help source code completion pop-up box (or dialog) 430 displays a number of possible completions for the partial statement 424 in programming instruction 422. The displayed source code completion options in pop-up box 430 are not intended to be complete, and merely show an example of an on-line help functionality that provides source code-completion options to a programmer as the programmer is typing in a new partial statement. The IDE 302 may access local source code index data store 314 in order to populate the pop-up box 430 with the source code-completion options set forth in FIG. 4. For example, IDE 302 may access a stub index associated with the source code file displayed in application workspace 406 and another stub index associated with the imported packages ("java.util.*"), and based on the functions available to the programmer at the scope indicated in application workspace 406, populate pop-up box 430 with possible source code completion options based, at least partially, on the stub indexes and the partial statement 424 entered by the programmer in programming instruction 422.

Based on a prediction algorithm executed by IDE 302, one of the proposed options in pop-up box 430 may be highlighted (or otherwise visually augmented) to indicate a completion option determined by the algorithm to be most probable. As the programmer continues typing in additional characters of the partial statement 424 in programming instruction 422, the IDE 302 may update the list of completion options in pop-up box 430. As set forth in FIG. 5, as the programmer continues adding characters to the partial statement 524 (e.g., adding the additional characters "at" to arrive at "Dat"), the list of completion options in pop-up box 530 is updated to remove those options that no longer match the added characters (e.g., "Dictionary( )"), and perhaps is also updated to select a new most probable option (e.g., highlighting the "Date(int year, int month, int date)" completion option). By selecting one of the options listed in pop-up box 530, the IDE 302 can complete the partial statement 522 without requiring the programmer to type all of the parameters into the application workspace 514, and without requiring the programmer to manually verify the list of parameters and proper spelling of the "Date" function by accessing the imported java.util.Date class (via the java.util package).

While FIGS. 4 and 5 set forth one example of an on-line help functionality (e.g., source code completion) that may be provided via IDE 302 using one or more source code indexes, other types of on-line help functionality could also be provided, such as refactoring, which involves a process of modifying a source code's internal structure to improve readability and/or reduce complexity without changing its functional behavior. Other functions can be developed that utilize the source code indexes, such as providing a list of possible future enhancements based on the TODO index, and providing source code/interface documentation from the text and/or stub indexes. Other possibilities exist as well.

6. Index File Creation

Given the source code illustrated in FIGS. 4 and 5, examples of source code indexes created by TODO indexer 320, text indexer 322, and stub indexer 324 can be illustrated for example purposes. For example, a TODO indexer may process the source code illustrated in FIG. 4, locate the comment prefix indicator "/*" in programming statement 414, locate the TODO predetermined identifier indicating a "to do" statement, and create a TODO index (perhaps ClientCompTest.todo, or a ClientCompTest.todo section of an aggregate index) of the ClientCompTest source code file including lines such as:

File: ClientCompTest.java; Version: 5.0; Last Modified: Jan. 1, 2011
 "ClientCompTest.java, line 5, TODO: Add testAlpha( )"
 . . .

The ClientCompTest.todo index could then be stored in local source code index data store 314. In one embodiment, the TODO statement in programming statement 414 may be added to an already-indexed source code file, and may thus be indexed locally by TODO indexer 320 via indexing engine 310. In at least one embodiment, the TODO statement in programming statement 414 may alternatively be indexed by a TODO indexer at remote indexing server 304, and a corresponding ClientCompTest.todo file provided to indexing engine 310 via remote indexing server 304.

In another example, a text indexer may process the source code illustrated in FIG. 4, generate a word list for each word located, and generate a text index (perhaps ClientCompTest.text or a ClientCompTest.text section of an aggregate index) of the ClientCompTest source code file including lines such as:

File: ClientCompTest.java; Version: 5.0; Last Modified: Jan. 1, 2011
 "protected, 2 occurrences, line 9, line 14"
 "@override, 2 occurrences, line 8, line 13"
 . . .

Similar to the disclosure above with respect to the TODO indexer, the text indexer 322 may index changes made to an existing source code file via indexing engine 310 and modify an existing text index (e.g., a ClientCompTest.text file). Additionally or alternatively, a text indexer executed at remote indexing server 304 may create or edit the ClientCompTest.text file, and may provide a corresponding ClientCompTest.text file to indexing engine 310 via remote indexing server 304.

In yet another example, a stub indexer may process the source code illustrated in FIG. 4, generate a skeleton file of the programming language specific structures set forth in FIG. 4, and generate a stub index (perhaps ClientCompTest.stub or a ClientCompTest.stub section of an aggregate index) of the ClientCompTest source code file including lines such as:

File: ClientCompTest.stub; Version: 5.0; Last Modified: Jan. 1, 2011
 PackageName: com.google.classpath
 Children

```
-Import List Stub
    -Import Statement: java.util.*
-Class Stub
    QualifiedName: com.google.classpath.ClientCompTest
    Name: ClientCompTest
    -Children
        ModifierListStub: <empty>
        TypeParameterListStub: <empty>
        RefListStub[Extends List]: TestCase
        RefListStub[Implements List]: <empty>
        FunctionStub[setUp:void]
            ReturnType: void
            Name: setUp
            Children
                ModifierListStub
                    AnnotationStub: @Override
                TypeParameterList: <empty>
                ParameterListStub: <empty>
                RefListStubList[Throws List]: Exception
...
```

The ClientCompTest.stub index may contain additional and/or different structural representations to aid IDE 302 in quickly locating relevant information for providing on-line help functionality. For example, the ClientCompTest.stub may include a stub tree node organization that couples the various programming constructs together in their own separate blocks (e.g., variables, functions, annotations, etc.). Other possibilities exist as well. Similar to the disclosure above with respect to the TODO indexer, the stub indexer 324 may process changes made to an existing source code file via indexing engine 310 and modify an existing text index (e.g., a ClientCompTest.text file). Additionally or alternatively, a stub indexer executed at remote indexing server 304 may create or edit the ClientCompTest.stub file, and provide a corresponding ClientCompTest.stub file to indexing engine 310 via remote indexing server 304.

7. Client—Server Message Flows

Figure 6:
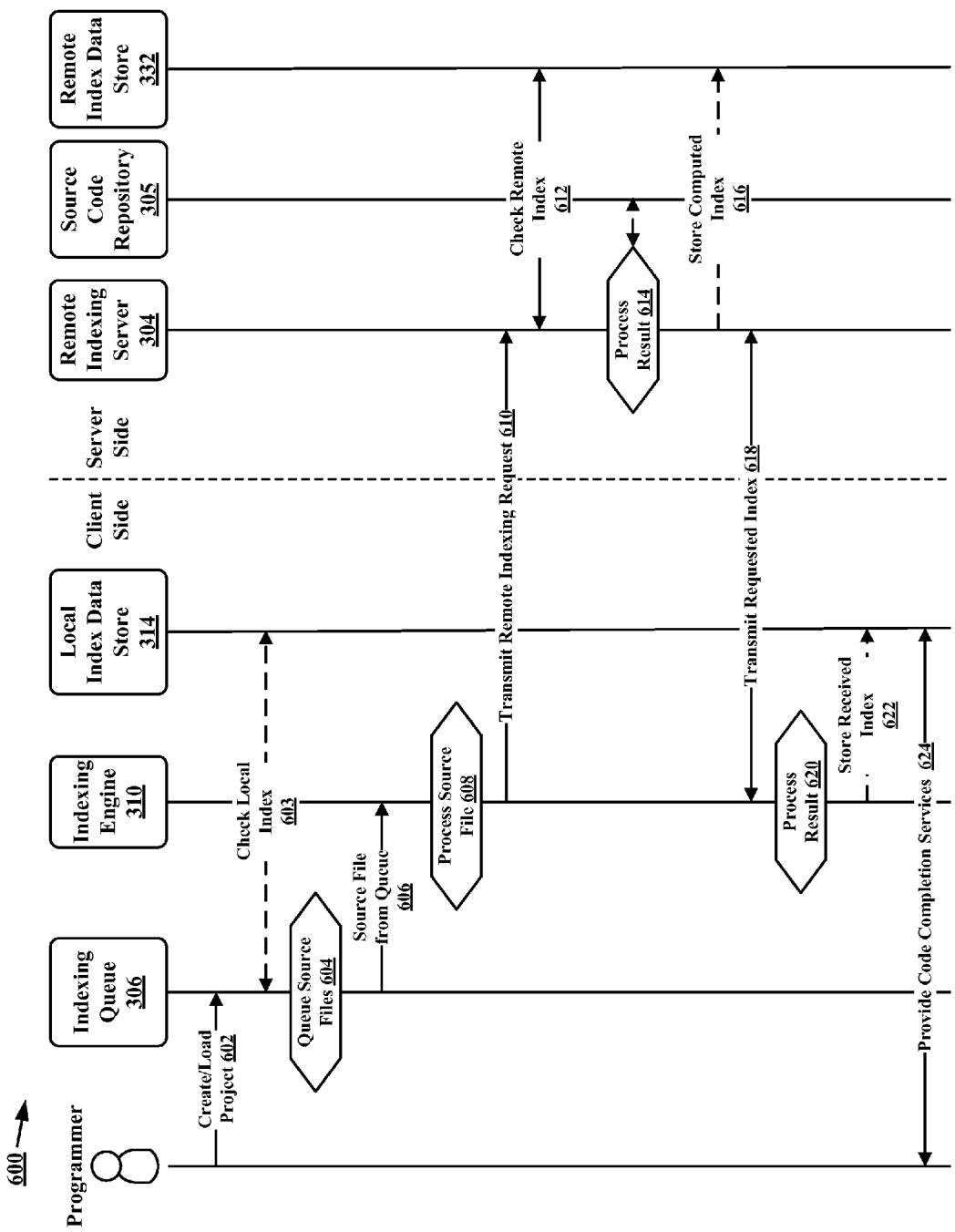
FIG. 6 is a ladder diagram in accordance with an example embodiment.
Figure 7:
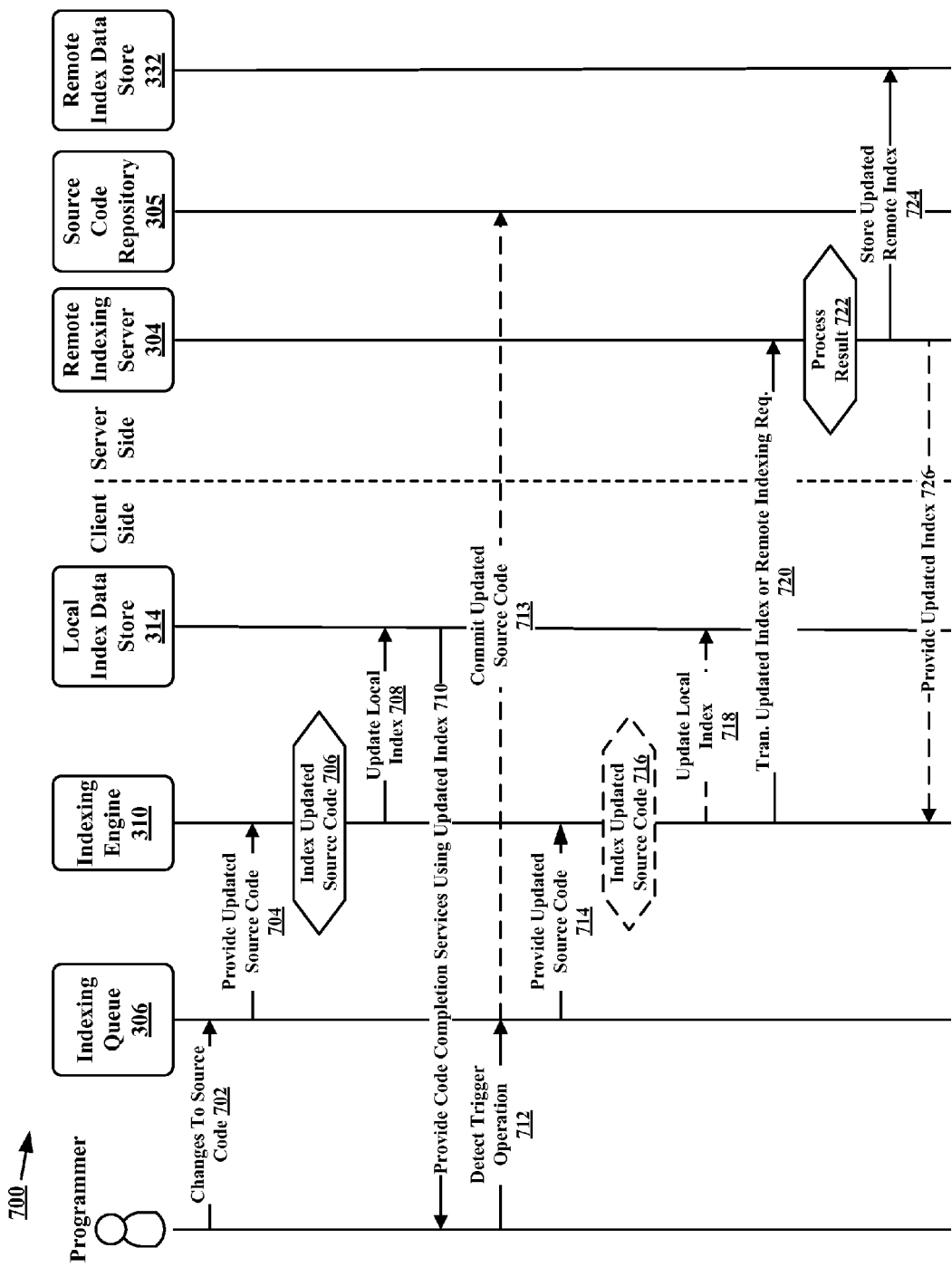
FIG. 7 is another ladder diagram in accordance with an example embodiment.

FIGS. 6 and 7 depict examples, in the form of ladder diagrams, of how information could flow from IDE 302 at a client device to a remote indexing server 304 in order to facilitate at least partial offloading of index management from IDE 302 to remote indexing server 304. Each block or step in FIGS. 6 and 7 may represent processing of information or transmission of information in accordance with example embodiments. Alternative embodiments are included within the scope of the example embodiments of the present disclosure. In these alternative embodiments, functions may be executed out of order from that shown or discussed, including substantially concurrent or in reverse order, depending on the functionality involved, as would be understood by those reasonably skilled in the art. Further, more or fewer blocks may be used with either of ladder diagrams 600 and 700, and these ladder diagrams may be combined with one another, in part or in whole, without departing from the scope of the invention. Also, it should be understood that at least some of the information transmissions shown in FIGS. 6 and 7 may be between software and/or hardware modules in a same physical device. However, other information transmissions shown in these figures may be between software and/or hardware modules on different devices.

FIG. 6 is a ladder diagram in accordance with an example embodiment in which a source code file is offloaded to remote indexing server 304 for processing. At step 602, a programmer uses IDE 302 to create and/or load a project including one or more source code files, perhaps by checking out a source code project from remote source code repository 305 via connection 307. This causes the IDE 302 to determine which ones of the one or more source code files (including perhaps all or none) need to be indexed. The IDE 302 may be configured to make this determination based on a number of heuristics. For example IDE 302 may be configured to presume that all source code files included in a project newly checked out from remote source code repository 305 need to be indexed. In at least one embodiment, IDE 302 may access the local index data store 314 at optional step 603 to determine whether an index has already been created for each of the one or more source code files. For each source code file, if a corresponding index is already available in local index data store 314, the index is loaded, and processing proceeds to step 624, in which source code completion services are provided to the IDE 302. For each source code file, if a corresponding index is not already available, the source code file is added to the indexing queue 306 at step 604.

At step 606, a source code file is retrieved from the indexing queue 306 and is provided to the indexing engine 310 for indexing by one or more indexers. At step 608, indexing engine 310 may determine what indexes should be produced for the retrieved source code file. Indexing engine 310 may be configured to request a particular set or subset of indexes based on a source code type. For example, Indexing engine 310 may default to requesting a first particular set of indexes for C++ files, while requesting a second different particular set of indexes for HTML files. Other possibilities exist as well.

At step 610, the indexing engine 310 then transmits a remote indexing request to the remote indexing server 304. The request transmitted at step 610 may contain a copy of the actual source code file for indexing, information sufficient to identify a corresponding copy of the source code file at source code repository 305 (e.g., information such as a file name, file path, last-modified date, hash value, etc.), or a link to a location at which the remote indexing server 304 can obtain a copy of the source code file. As mentioned earlier, in one embodiment, an initial transmission at step 610 may include just enough information to identify a source code file without actually sending the source code file or link to the source code file (e.g., information such as a file name, file path, last-modified date, hash value, etc.). The initial transmission may request remote indexing server 304 check its remote source code index data store 332 for already-created corresponding indexes. In the event such a corresponding index exists, remote indexing server 304 may transmit the corresponding index back to indexing engine 310. In the event such a corresponding index does not yet exist, remote indexing server 304 may transmit an error message back to indexing engine 310 (still at step 610) requesting that the corresponding source code file be transmitted in response for full indexing by remote indexing server 304 or indicating that it is retrieving the source code file from source code repository 305. Indexing engine 310 may then transmit the corresponding source code file in a subsequent transmission at step 610 or wait for the remote indexing server 304 to retrieve the source code file from source code repository 305. Other possibilities exist as well.

Upon receiving the remote indexing request, remote indexing server 304 accesses the remote index data store 332 in step 612 to determine whether a corresponding index has already been created for the corresponding source code file. As set forth earlier, remote indexing server 304 can use a number of different methods to determine if a corresponding index already exists, such as comparing one or more of filenames, version numbers, last-modified dates, and hash values associated with the source code file. At step 614, the remote indexing server 304 processes the result. If an index does not already exist, and the actual source code file itself was not provided to the remote indexing server 304 at step 610, the remote indexing server 304 may access the source code repository 305 to obtain the source code file indicated in the request at step 614. In at least one embodiment, where links are provided in the request at step 610 that link to a device other than source code repository 305, the remote indexing server 304 may access the provided link(s) to retrieve the source code files at step 614 (not illustrated).

Then, also at step 614, an indexing engine (perhaps similar to indexing engine 310) in remote indexing server 304 generates a predetermined set of indexes (or perhaps a set of indexes as indicated in the indexing request transmitted in step 610), and optionally stores the computed index(es) in remote index data store 332 at step 616. Along with storing the created index, remote indexing server 304 may create a mapping between the created index and information regarding the source code file from which the index was created (e.g., one or more of a filename, version number, last-modified date, and hash value of the source code file). By storing the mapping, future indexing requests on source code files matching the mapping information can be completed without having to re-index a same source code file. Instead, the matching index from remote index data store 332 can be retrieved. At step 618, the created index or the index retrieved from remote index data store 332 is provided to the indexing engine 310. In addition, at step 618, remote indexing server 304 may also transmit the mapping information created in step 616 for use by indexing engine 310.

At step 620, indexing engine 310 processes the received index, and at step 622, optionally stores a copy of the received index in local index data store 314. In at least one embodiment, indexing engine 310 may also store mapping information it received from the remote indexing server 304 in step 618. By storing the index and mapping information in local index data store 314, future indexing requests made by IDE 302 for the same source code file can be fulfilled locally, without having to transmit source code files to remote indexing server 304 and wait for a responsive transmission of a corresponding index. At step 624, source code completion services are provided to IDE 302 using the received index(es). For example, source code completion services may be provided as set forth with respect to FIGS. 4 and 5 above.

FIG. 7 is another ladder diagram in accordance with an additional example embodiment in which source code updates are indexed locally, and updates intermittently transmitted to remote indexing server 304. While FIG. 6 set forth an example of loading a new source code file that did not have any index information associated with it, FIG. 7 sets forth an example wherein changes are made locally to a source code file via IDE 302, wherein the source code file already has an index associated with it (for example, perhaps an index previously created at remote indexing server 304 in a manner set forth in FIG. 6). At step 702, a programmer makes changes to a source code file, and the IDE 302 provides the source code file is to indexing queue 306 for re-indexing. The source code file may, for example, be provided to the indexing queue 306 in response to an input operation by the programmer instructing the IDE 302 to re-index the source code file, or could be provided to the indexing queue 306 automatically, perhaps upon a detected "commit" or "save" operation performed on the source code file by the programmer. Other possibilities exist as well.

At step 704, the updated source code file is provided to the indexing engine 310. At step 706, one or more indexers in the indexing engine 310 update corresponding indexes with respect to the received updated source code file. In one example, this process may involve a complete re-indexing of the updated source code file. In another example, this process may involve retrieving existing index(es) from the local index data store 314, comparing the updated version of the source code file with a previously-indexed version of the source code file, and updating the retrieved index(es) with any additions or changes detected in the updated source code file (not shown in FIG. 7). At step 708, the updated index is stored back to local index data store 314, and at step 710, source code completion services are provided to IDE 302 using the updated index. The source code completion services can thus be provided to the programmer while the programmer continues editing the same or different source code files, or while the programmer creates one or more new source code files that are associated with the indexed source code file(s).

Perhaps after editing one or more source code files, at step 712, a trigger operation is detected, and as a result, one or more updated source code files are added to the indexing queue 306. The trigger detected at step 712 may be generated by an occurrence of one of many possible events, such as a "source code commit" operation executed by the programmer, a "file save" operation executed by the programmer, a "time-based trigger" detected by IDE 302, a "run" or "compile" operation executed by the programmer, or any other event that may cause changed source code files and their respective indexes to be stored. At step 713, which may be executed by IDE 302 at substantially a same time as step 712, IDE 302 may commit the updated source code file(s) to source code repository 305. At step 714, the updated source code file(s) are provided to indexing engine 310.

At optional step 716, one or more indexers in the indexing engine 310 update corresponding indexes with respect to the received updated source code file(s) in a same or similar manner to that set forth above with respect to step 706. At step 718, the updated indexes are saved to local index data store 314 (perhaps including an associated mapping between the source code file and indexes). At step 720, the indexing engine 310 may transmit either the updated indexes or a remote indexing request to remote indexing server 304. In the event that step 716 is not executed by indexing engine 310, the transmission at step 720 will include a remote indexing request including the updated source code file(s), links to the update source code file(s), or sufficient information for the remote indexing server 304 to retrieve the update source code file(s) committed to the source code repository 305 in step 713. In the event that step 716 is executed by indexing engine 310, the transmission in step 720 may also contain a copy of the actual updated source code file(s) or information necessary (e.g., mapping information) to identify the source code file(s) without actually sending the source code file(s) or a link to the source code file(s) (e.g., information such as a file name, last-modified date, hash value, etc.) so that the remote indexing server 304 can store mapping information for use in providing corresponding transmitted indexes in response to future index requests.

At step 722, the remote indexing server 304 processes the received index and/or remote indexing request. In the event that the index and source code file(s) were transmitted at step 720, remote indexing server 304 may generate mapping information between the received index and source code file(s), including, for example, information such as the source code file's file name, last-modified date, hash value, etc. The index and mapping data may then be stored in remote index data store 332 at step 724. In the event that the transmission at step 720 included a request to retrieve source code file(s) committed to source code repository 305 at step 713, remote indexing server 304 may retrieve the corresponding source code files indicated in the request from source code repository 305 via connection 307, index the retrieved source code file(s), generate mapping information between the generated index(es) and retrieved source code file(s), and stored one or more of the source code file(s), index(es), and mapping information to remote index data store 332 at step 724. At optional step 726, the generated mapping information and/or the generated index(es) may be provided back to indexing engine 310 for storage in local source code index data store 314.

In the event that indexing engine executed step 716, and mapping information and index(es) were transmitted to the remote indexing server 304 at step 720, remote indexing server 304 may simply store the received index(es) and mapping information in remote index data store 332 at step 724. Other possibilities exist as well.

8. Computer Readable Instructions

Figure 8:
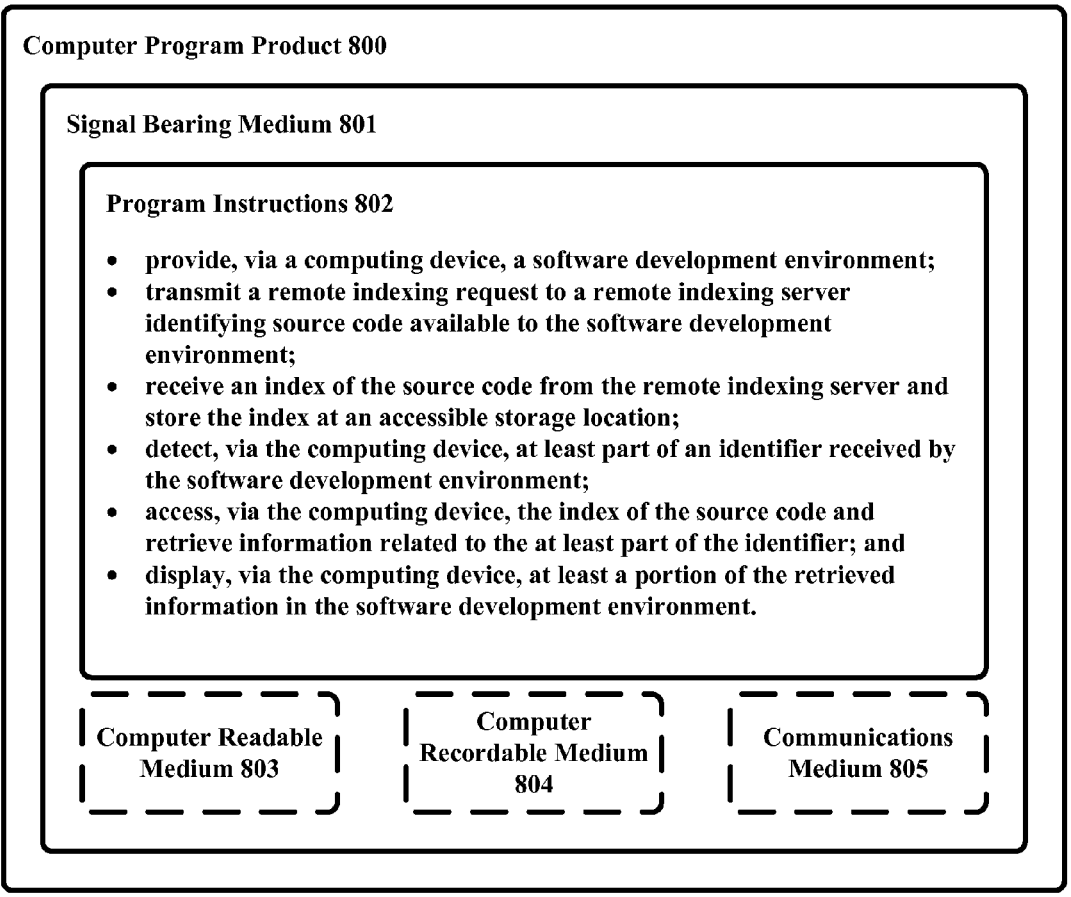
FIG. 8 is a schematic illustrating a conceptual partial view of an example computer program product.

In some embodiments, the disclosed methods (for example, those methods described above with respect to FIGS. 3-7) may be implemented as computer program instructions encoded on a computer-readable storage media or tangible computer-readable storage media in a machine-readable format. FIG. 8 is a schematic illustrating a conceptual partial view of an example computer program product 800 that includes a computer program for executing a computer process on a computing device, arranged according to at least some embodiments presented herein. In one embodiment, the example computer program product 800 is provided using a signal bearing medium 801. The signal bearing medium 801 may include one or more programming instructions 802 that, when executed by one or more processors, may provide functionality or portions of the functionality described above with respect to FIGS. 3-7. Thus, for example, referring to the embodiments illustrated in FIGS. 6 and 7, one or more features of blocks or steps 602-624 and/or 702-724 may be undertaken by one or more instructions associated with the signal bearing medium 801.

In some examples, the signal bearing medium 801 may encompass a tangible computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communication link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more programming instructions 802 may be, for example, computer executable and/or logic implemented instructions. In some examples, a computing device such as the computing device 200 of FIG. 2A may be configured to provide various operations, functions, or actions in response to the programming instructions 802 conveyed to the computing device 200 by one or more of the computer readable medium 803, the computer recordable medium 804, and/or the communications medium 805.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
providing, via a computing device, a software development environment;
prior to transmitting source code to a remote indexing server, determining that an index for the source code is not already locally available to the computing device;
transmitting, via the computing device, the source code available to the software development environment to the remote indexing server for indexing;
in response to the transmitting, subsequently receiving an index of the source code created by the remote indexing server at the computing device and storing the index on the computing device;
detecting, via the computing device, at least part of an identifier received by the software development environment;
accessing, via the computing device, the index of the source code stored on the computing device and retrieving information related to the at least part of the identifier; and
displaying, via the computing device, at least a portion of the retrieved information in the software development environment.

2. The method of claim 1, wherein determining that the index is not already locally available to the computing device comprises comparing a version identifier stored in the source code with a version identifier associated with a locally-stored index and not finding a match.

3. The method of claim 1, wherein determining that the index is not already locally available to the computing device comprises comparing a last-modified date associated with the source code with a last-modified date associated with a locally-stored index and not finding a match.

4. The method of claim 1, wherein the identifier is a programming language-specific identifier.

5. The method of claim 4, wherein the programming language-specific identifier is one of a class name, a function name, a typedef, a variable, a macro, a parameter, a declarator, a type qualifier, a keyword, a package, an interface, an expression, a namespace, a template, an object, a label, an operator, a file path, an attribute, a statement, an annotation, and a literal constant.

6. The method of claim 5, wherein the programming language-specific identifier is a function name, and the retrieved information related to the identifier includes a list of function parameters and their associated data types associated with the function name.

7. The method of claim 1, wherein the identifier is a programming language-agnostic identifier.

8. The method of claim 7, wherein the programming language-agnostic identifier is a commented identifier preceded by a comment prefix.

9. The method of claim 8, wherein the commented identifier is a TODO identifier associated with comments indicating a future enhancement to be added to the source code.

10. A system, comprising:
data storage;
a processor configured to:
provide a software development environment;
prior to causing source code to be transmitted to a remote indexing server, determine that an index for the source code is not already available to the system;
cause the source code available to the software development environment to be transmitted to the remote indexing server for indexing;
receive an index of the source code created by the remote indexing server;
store the index at an accessible storage location in the data storage;
detect at least part of an identifier received by the software development environment;
access the index of the source code stored in the data storage and retrieve information related to the identifier; and
cause at least a portion of the information related to the identifier to be displayed in the software development environment.

11. The system of claim 10, wherein the identifier is a programming language-specific identifier.

12. The system of claim 10, wherein the identifier is a programming language-agnostic identifier.

13. An article of manufacture including a non-transitory computer readable medium having instructions stored thereon that, in response to execution by a computing device, cause the computing device to perform operations comprising:
providing a software development environment;
prior to transmitting source code to a remote indexing server, determining that an index for the source code is not already available to the computing device;
transmitting the source code available to the software development environment to a remote indexing server for indexing;
receiving an index of the source code created by the remote indexing server and storing the index on the computing device;
detecting at least part of an identifier received by the software development environment;
accessing the index of the source code stored on the computing device and retrieving information related to the identifier; and
displaying at least a portion of the information related to the identifier in the software development environment.

14. The article of manufacture of claim 13, wherein the identifier is a programming language-specific identifier.

15. The article of manufacture of claim 13, wherein the identifier is a programming language-agnostic identifier.

16. A system, comprising:
non-transitory means for storing; and
means for processing, comprising:
means for providing a software development environment;
means for determining, prior to transmitting source code to a remote indexing server, that an index for the source code is not already available to the system;
means for transmitting the source code available to the software development environment to the remote indexing server for indexing;

means for receiving an index of the source code created by the remote indexing server and storing the index on the non-transitory means for storing;

means for detecting at least part of an identifier received by the software development environment;

means for accessing the index of the source code stored on the non-transitory means for storing and retrieving information related to the identifier; and means for displaying at least a portion of the information related to the identifier in the software development environment.

17. The system of claim 16, wherein the identifier is a programming language-specific identifier.

18. The system of claim 16, wherein the identifier is a programming language-agnostic identifier.

* * * * *